United States Patent [19]

Dietl et al.

[11] 4,312,850

[45] Jan. 26, 1982

[54] SEMICONTINUOUS PROCESS FOR THE MANUFACTURE OF PURE SILICON

[75] Inventors: Josef Dietl, Neuötting; Claus Holm, Baldham; Erhard Sirtl, Marktl, all of Fed. Rep. of Germany

[73] Assignee: Helictronic Forschungs- und Entwicklungs- Gesellschaft fur Solarzellen-Grundstoffe mbH, Berghausen, Fed. Rep. of Germany

[21] Appl. No.: 196,498

[22] Filed: Oct. 14, 1980

[30] Foreign Application Priority Data

Nov. 8, 1979 [DE] Fed. Rep. of Germany ....... 2945070

[51] Int. Cl.³ ............................................. C01B 33/02
[52] U.S. Cl. ................................................... 423/350
[58] Field of Search ..................... 423/345, 350; 75/27

[56] References Cited

U.S. PATENT DOCUMENTS

| | | | |
|---|---|---|---|
| 1,942,015 | 1/1934 | Wydler | 75/27 |
| 3,097,068 | 7/1963 | Litz et al. | 423/348 |
| 3,396,012 | 8/1968 | Huml | 423/350 |

FOREIGN PATENT DOCUMENTS

| | | | |
|---|---|---|---|
| 200106 | 10/1958 | Austria | 423/318 |
| 609481 | 10/1948 | United Kingdom | 75/27 |

*Primary Examiner*—G. O. Peters
*Attorney, Agent, or Firm*—Allison C. Collard; Thomas M. Galgano

[57] ABSTRACT

Pure silicon is obtained in a cyclic process by reducing quartz sand with aluminum; the finely divided quartz is dissolved in an aluminum sulphide slag and is reduced by molten aluminum. The molten aluminum also serves as a solvent for the elemental silicon which crystallizes out and precipitates as the temperature falls. Aluminum oxide formed during the reduction is extracted from the slag and passed on for melt electrolysis in order to recover the aluminum.

8 Claims, 1 Drawing Figure

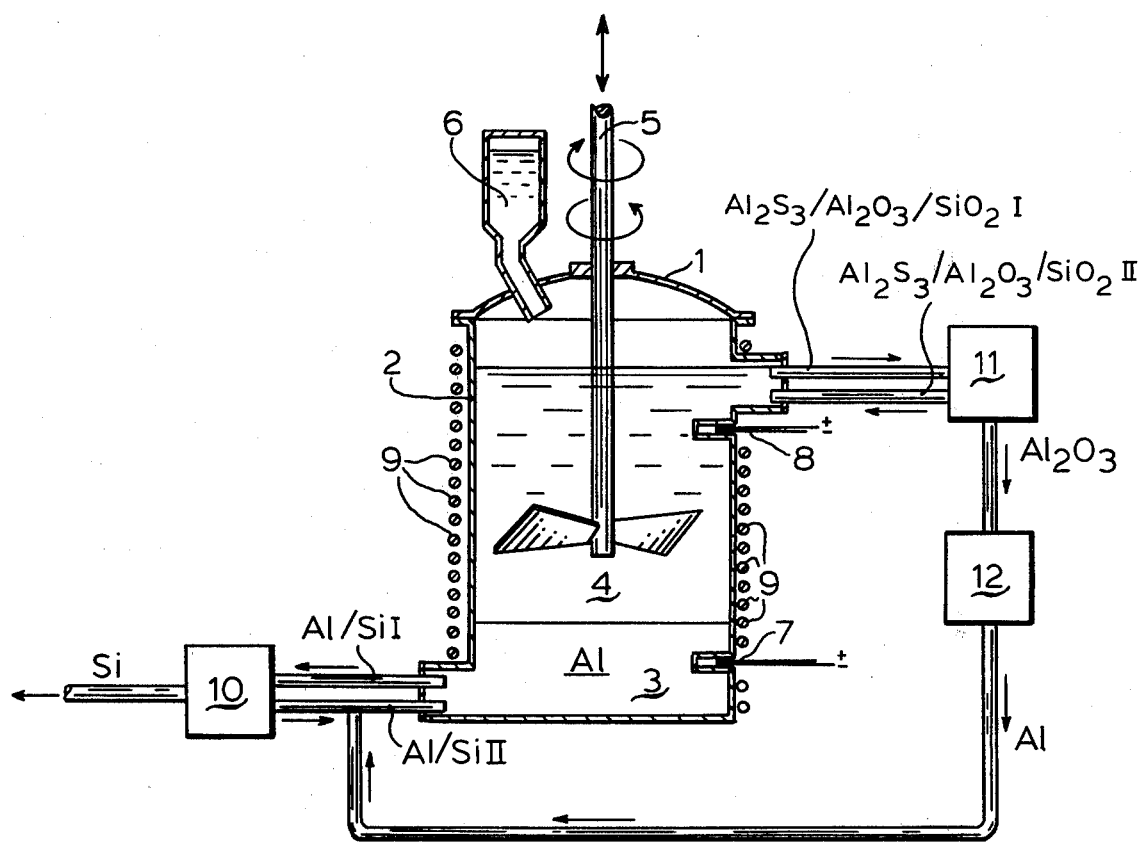

SEMICONTINUOUS PROCESS FOR THE MANUFACTURE OF PURE SILICON

The present invention relates to a semicontinuous process for the manufacture of pure silicon from quartz sand by reduction with aluminum.

In the conventional process for the manufacture of high purity silicon for electronic components, crude silicon, obtained by reduction of quartz with carbon, is converted into trichlorosilane by hydrogen chloride. Following distillation and reduction with hydrogen, high purity polycrystalline silicon is deposited from this trichlorosilane onto heated carriers. Further purification, and conversion into monocrystalline material, can be subsequently achieved by the Czochralski crucible-pulling method, or by crucible-free zone melting.

Such a procedure is, however, much too expensive and energy intensive for the mass production of inexpensive silicon-based solar cells for terrestrial use. Furthermore, the degree of purity of silicon that is essential for electronic components is not absolutely necessary for the production of solar cells of polycrystalline silicon having grain boundaries which have a gettering effect on impurities.

Although other methods of producing silicon from quartz are known from the literature, these have never been developed to provide a process that can compete with the conventional electric-arc process described above.

Thus, in the method proposed by K. A. Kühne and described in *Chemischen Zentralblatt* 75, page 64, No. 147 871 (1904), aluminum chips and/or aluminum powder are mixed with sulphur and quartz and ignited using a primer pellet. The mixture begins to burn and melts at white heat to form a simmering mass consisting of "sulphur-aluminum", in which embedded silicon crystals are found after cooling.

This method, also known as the sulphur-thermite method, was further developed by H. V. Wartenberg, but even then it only provided silicon in a yield of 50% of the theoretical yield. Even after purification "by melting in silicon tetrachloride", a content of 0.1% of metallic impurities still remained so that, as even admitted by the producer, the material was found to be at the lower limit of usefulness. [*Zeitschrift fur anorganische Chemie* 286, 247–253 (1956)].

It is therefore an object of the present invention to provide a process, suitable for large-scale use, to enable pure silicon for solar cells to be produced from quartz without the need for expensive vapor phase deposition.

This object is achieved by means of a process which is characterized in that quartz is introduced, batch-wise and while being stirred, into a closed reaction vessel containing molten aluminum sulphide in addition to aluminum, and in that the aluminum, enriched by the elemental silicon that forms, is removed periodically, slowly cooled to a minimum temperature of approximately 600° C., separated from the precipitating silicon, and then returned to the reaction vessel, whereas the aluminum oxide, formed during the reaction, is removed from the sulphide melt that is to be returned to the reaction vessel, and again reduced, by melt electrolysis, to reusable elemental aluminum.

The quartz to be used in the process must not be added in lumps, as in the electric-arc process for example, but is expediently introduced into the reaction vessel as quartz sand having a particle size ranging from approximately 0.1 to 2 mm. If the quartz sand contains large amounts of impurities, it is recommended that it be subjected to a preliminary treatment to achieve a degree of purity of 98%, and preferably approximately 99.5%, since otherwise the aluminum sulphide slags used in the method will have to be renewed too quickly. The initial material used may, of course, also be, e.g., kaolinites, various forms of mica, feldspar or stratified silicates previously subjected to chemical and physical treatment to form silica powder.

In the process according to the invention, aluminum sulphide advantageously together with approximately from 10 to 40% by weight, preferably from 20 to 30% by weight, of quartz and/or aluminum oxide, advantageously in a ratio of from 1:2 to 2:1, and aluminum, are placed in a closed reaction vessel of, for example, graphite. The quartz and/or aluminum oxide additions serve in particular to reduce the melting point of the aluminum sulphide (melting point approximately 1100° C.), so as to enable the reaction to take place at temperatures of from 900° to 1050° C., preferably 950° to 1000° C., since if the temperature in the reaction vessel exceeds 1100° C., a side reaction is promoted, resulting in the formation of silicon monosulphide and silicon disulphide. These silicon sulphides would evaporate from the system and become deposited on cooler parts of the apparatus. The lower limit of 900° C. results from the slag system, which solidifies at lower temperatures. It is possible to go below this lower limit only if further additives for reducing the melting point, such as sulphide or halide additives, particularly fluorides or sulphides of the alkali metals and alkaline earth metals, are added to the slag system.

The aluminum, which is expediently introduced before the slag, as well as the slag itself, can be added in the molten state or can be heated in the reaction vessel to the indicated working temperatures. When considering quantities, it is necessary to take into account the double function of aluminum in the process according to the invention: on the one hand, it serves to reduce silica to elemental silicon while, on the other hand, it is used as a solvent for the silicon formed in this way. The optimum ratio of slag to aluminum melt is approximately 3:1 parts by weight, since larger quantities of aluminum render the process less efficient. This is because it is advantageous to crystallize the greatest quantity of silicon from the smallest quantity of aluminum melt, not only because it would otherwise be costly to keep the system at the desired temperature but also because correspondingly larger reaction vessels would be required.

The quartz addition used in the method is such that the slag always has a content of at least 10% by weight of silica, and the silicon obtained by reduction of said silica by aluminum is dissolved in the remaining aluminum. In a particularly preferred embodiment of the process, the quartz charge, which is stirred when introduced, generally amounts to an average of approximately 20 to 40% by weight, based on the aluminum sulphide slag. The minimum and maximum silicon content in the aluminum phase are determined mainly from the phase diagram and the fact that aluminum, consumed by the reduction, must be made whole by the addition of pure aluminum. If, for example, operations are carried out at a temperature of 1000° C., then the aluminum phase picks up silicon in amounts of up to approximately 45 atom % maximum, whereas after cooling has occurred in the crystallization chamber to a temperature of 600° C., for example, it has a residual content of only approximately 12 atom % silicon (see Hansen, "Constitution of Binary Alloys", 2nd Edition, McGraw Hill Book Company, Inc., New York 1958, page 133). When aluminum is returned to the reaction vessel, this residual content is further reduced in dependence upon the further charge of fresh electrolytic aluminum.

The quartz sand is introduced into the reaction vessel expediently with the aid of a suitable stirrer. On the one hand, this stirrer should mix the added quartz into the slag so as to cause dissolution in the aluminum sulphide and, on the other hand, it should carry the aluminum phase into the slag, expediently in the opposite direction. Suitable for this purpose is, for example, a wing stirrer, which, because of its construction, provides an action similar to that of a ship's propeller. The stirrer should also be vertically displaceable so that, in its upper position, it is able to stir in the quartz more easily and, in its lower position, it is able to cause the aluminum to mix into the slag layer in a swirling motion. Particularly suitable materials of which such a stirrer may be made are carbon and graphite.

In the reaction phase, as it is called, the quartz sand is stirred into the slag layer by a stirrer of this type occupying a central position, whereas after the particular quartz charge has been completely added, the stirrer is expediently lowered into the slag/aluminum phase boundary, and the aluminum pool is stirred up by causing the stirrer to rotate in the opposite direction, so that droplets of aluminum, which reduce the quartz and bring the resulting silicon into solution, are dispersed in the slag phase. This can be achieved without difficulty by mixing by stirring, since the difference between the density of the slag and that of the aluminum is small.

Because of the exothermic nature of this reduction, external heating, for example, resistance heating or, if the crucible has a refractory covering, flame heating, is required mainly only when starting up the process, that is to say, for melting the aluminum and aluminum sulphide, whereas in the reaction phase, the temperature variation is determined mainly by the vertical position and speed of revolution of the stirrer, since contact between the materials involved in the reaction is decisively influenced by these factors.

The limit of the reaction phase is determined by the enrichment of the content of aluminum oxide in the slag, formed during reduction, to a maximum of approximately 40% by weight, since otherwise the system solidifies because of the rise in the melting point of the slag with increasing aluminum oxide content.

Since, as previously mentioned, reduction proceeds on a markedly exothermic basis, the course of the reaction can be readily monitored and controlled by means of thermocouples placed at various points in the wall of the reaction vessel.

After reduction has ceased—this being indicated by a drop in temperature—the reaction phase is followed by a killing phase, in which the stirrer is stopped and may be removed upwardly from the slag, and the aluminum droplets with the dissolved silicon are thus allowed to sink from the slag into the metal pool, whereas aluminum oxide that has crystallized out in the slag rises to the surface.

On completion of the killing phase, that is to say, after separation of the slag and the aluminum pool, the aluminum melt, containing approximately 40 atom % of silicon, is drawn off and passed into a crystallization chamber. Here, the temperature is slowly reduced, expediently at a rate of approximately from 0.5° to 3° C. per minute, to a minimum of approximately 600° C. (temperature of eutectic: 577° C.), and preferably to approximately 650° to 700° C. Then, the mixture is advantageously passed from the crucible, in which it has cooled, into a heatable centrifuge in which the liquid aluminum is separated off. The centrifuge basket as well as the crucible for the crystallization stage can be of a ceramic material or carbon, and the basket may also be of steel. A further possible way of separating the mixture consists of filtering off the silicon lamellae, that have crystallized out, using quartz wool for example.

The silicon lamellae, separated off by one or the other method, are purified, after cooling, by washing with dilute aqueous hydrochloric acid or alcohol, so as to remove residual aluminum, and, in the last-mentioned method, when ethanol is used, commercial aluminum ethoxide is obtained as a reaction product. To separate off further occluded aluminum, it is recommended that the silicon lamellae be comminuted to a size of approximately 50 μm and again be washed with dilute hydrochloric acid or alcohol, and in this way the aluminum content can be reduced to approximately from 400 to 600 ppm by weight, roughly corresponding to the maximum solubility of aluminum in silicon at the precipitation temperature. An aluminum level of this kind in silicon can be tolerated as the basic doping in some polycrystalline types of solar cell, whereas in other cases, the aluminum content can be further reduced by known methods, such as slag treatment, segregation by directional solidification or evaporation in vacuo, these methods being used singly or in combination. If, for example, use is made of the slag treatment, in which the silicon is introduced into an extraction melt consisting of, for example, alkaline earth metal silicates and/or alkaline earth metal fluorides, it is possible to dispense with the prior washing treatment with hydrochloric acid or alcohol.

The separated aluminum, depending upon the temperature to which it has been cooled for crystallizing out the silicon, still has a residual silicon content on the order of 15 to 20 atom %, which, however, is not lost since it is then returned to the reaction vessel, together with pure electrolytic aluminum, to compensate for the part oxidized to aluminum oxide during the reaction, and in the reaction vessel it picks up further silicon from the reduction.

On completion of stirring, mixing and therefore also the reaction rate, diminish during the killing phase, so that at the same time the temperature in the slag drops and aluminum oxide from the reduction precipitates. The precipitating aluminum oxide is removed at a temperature of the slag at which the latter is still molten, i.e., at approximately 950° C. in the preferred form of the method, and the aluminum oxide is transferred into an aluminum oxide separation chamber. A further possibility consists of transferring the slag layer, entirely or partially, into an aluminum oxide separation chamber and, after the temperature has dropped to just above the melting point of the slag, separating this off from the aluminum oxide by centrifuging or by filtering through a suitable quartz filter, and returning the slag to the reaction vessel for a further reduction cycle. This returned aluminum sulphide slag contains, in addition to silica, approximately 15 to 20% by weight of aluminum oxide, corresponding to the solubility of aluminum oxide in aluminum sulphide at the temperature concerned. The impurities in the quartz sand that is used are converted by the slag mainly into sulphide compounds, which are partly evaporated out of the system. If, however, depending on the purity of the quartz material used, the slag has picked up an excessive amount of impurities, the entire slag is discarded and fresh aluminum sulphide with corresponding additions of quartz and/or aluminum oxide is used.

The aluminum oxide separated off in the aluminum oxide separation chamber is then subjected to reduction, for example, to conventional melt electrolysis in molten cryolite, for the purpose of recovering the aluminum. The resulting pure aluminum is then again added, in suitable proportions to the aluminum returned to the reaction vessel from the silicon crystallization stage.

Other objects and features of the present invention will become apparent from the following detailed description when taken in connection with the accompanying drawing which discloses one embodiment of the invention. It is to be understood that the drawing is designed for the purpose of illustration only, and is not intended as a definition of the limits of the invention.

In the drawing, a novel cyclic process embodying the present invention is diagrammatically illustrated.

Referring now in detail to the drawing, aluminum 3 and an overlying aluminum sulphide slag 4 are brought into a reaction vessel 2 closed by a cover 1. Quartz sand is introduced into the slag 4 through a feed unit 6 and is stirred into it by means of a vertically displaceable stirrer 5. Thereafter, the aluminum phase is mixed into the slag in a swirling motion by reversing the direction of revolution of the stirrer and by lowering it; the progress of the reaction being monitored by way of temperature-measuring sensors 7 and 8, and the position and speed of revolution of the stirrer, as well as the external heating means 9, being controlled accordingly.

After the reaction has ceased, the aluminum pool is transferred to a crystallization chamber 10, cooled and, after separation of the crystallized silicon, returned to the reactor 2, together with any silicon that is still in solution. While this is happening, precipitated aluminum oxide, together with aluminum sulphide slag and quartz dissolved therein, is transferred to an aluminum oxide separating chamber 11, separated from slag 4 and passed to the melt electrolysis unit 12, from which recovered aluminum is again added in proportional amounts to the aluminum pool 3 in reaction vessel 2. The aluminum sulphide slag remaining after separation of precipitated aluminum oxide, and which still contains aluminum oxide and silica, is likewise returned to the reaction vessel before a new charge of quartz material is introduced into reaction vessel 2 through feed means 6.

In the following example, the process of the present invention will be more fully described, and is given by way of illustration and not of limitation.

EXAMPLE

The reaction vessel used was a carbon crucible having a cover provided with an opening for a propeller-type mixer or stirrer made of graphite.

This crucible was filled with 7.9 kg aluminum (purity 99.9%), 18 kg aluminum sulphide (purity 99.9%), 3.5 kg corundum powder (purity 99.9%), and 6 kg quartz sand (purity 99.9%, particle size 0.1 to 0.5 mm). This mixture was melted under a layer of protective gas (nitrogen/argon) by means of a radiant-heating unit surrounding the crucible, and was maintained at a temperature of 1050° C. While stirring was carried out at an average rate of 100 rev/min, a further 6.5 kg of quartz sand of the purity given above was stirred in over a period of one hour. The stirrer was then lowered into the slag/aluminum pool phase boundary and its direction of rotation was reversed. The external heating means was switched off, and stirring was carried out at a rate of 100 to 150 rev/min, so that the temperature could be kept substantially constant within the range of from 1000° to 1050° C. When, after approximately 30 minutes, the temperature, despite stirring, had begun to fall, the stirrer was lifted out of the system. After the temperature had dropped to 950° C., the aluminum pool was tapped and was cooled to 700° C. over a period of four hours, in another carbon crucible. The crystallized silicon lamellae were then filtered off using a filter of compressed quartz wool and were washed with 20% by weight of aqueous hydrochloric acid. Following filtering, the silicon lamellae were comminuted in a tungsten carbide ball mill to an average particle size of approximately 50 $\mu$m and were again washed with dilute aqueous hydrochloric acid. After further filtering and washing free of acid, 2 kg of silicon were obtained, with the following analysis determined by means of an atomic-absorption spectrometer: less than 600 ppm by weight of aluminum, as well as iron, calcium and copper below the detection limit. Using the colorimetric method, the boron content was found to be 2 ppm by weight and the phosphorus content 0.2 ppm by weight.

In a second cycle, the molten aluminum, still containing approximately 20 atom % of silicon, was returned to the reaction vessel together with the aluminum slag still containing approximately 20% by weight of aluminum oxide and approximately 20% by weight of silica, the aluminum oxide formed during reduction, having been removed from the slag apart from the stated residual content.

2.6 kg of aluminum were then added, and subsequently 4.3 kg of quartz sand were stirred in the procedure of the first cycle and repeated. 2 kg of silicon having the above analysis was obtained. The quantity of quartz reduced to provide the same quantity of silicon results from the fact that the aluminum from the first cycle that is necessary for dissolving the silicon that is formed still contains approximately 20% by weight of silicon.

Thus, while only one embodiment and example of the present invention has been described, it will be obvious that many changes and modifications may be made thereunto, without departing from the spirit and scope of the invention.

What is claimed is:

1. A semicontinuous process for the manufacture of silicon from quartz sand by reduction with aluminum, comprising the steps of:
   introducing quartz, batch-wise and while being stirred, into a closed reaction vessel containing molten aluminum sulphide in addition to aluminum;
   periodically removing aluminum, enriched by the elemental silicon that forms, said aluminum then being slowly cooled to a minimum temperature of approximately 600° C., and being separated from the precipitating silicon; and
   removing the aluminum oxide, formed during the reaction, from the aluminum sulphide melt, said aluminum oxide then being separated from adhering aluminum sulphide melt.

2. The process according to claim 1, wherein the quantity of quartz that is stirred in is, on average, approximately from 20 to 40% by weight, based on the aluminum sulphide.

3. The process according to claim 1 or 2, wherein the temperature in the reaction vessel is maintained at approximately 950° to 1050° C. during the reduction.

4. The process according to claim 1 or 2, wherein the silicon-containing aluminum is cooled in a crystallization chamber at a rate of from 0.5° to 3° C. per minute.

5. The process according to claim 1, wherein said aluminum oxide separating step is performed in an aluminum oxide separation chamber in which a temperature of 950° to 900° C. is set.

6. The process according to claim 1, wherein said quartz is introduced by a screw-type stirrer, the direction of rotation of which is reversed after each quartz charge has been completely added.

7. The process according to claim 6, additionally including the step of regulating the vertical position and rate of revolution of the stirrer to control the intensity of the reaction, so as to thereby use the heat of said reaction to regulate the temperature of the process.

8. The process according to claim 1 or 2, wherein the aluminum separated from the precipitating silicon is returned to the reaction vessel, and the aluminum sulphide adhering to the removed aluminum oxide is separated therefrom and returned to the reaction vessel, said aluminum oxide being again reduced, by melt electrolysis, to reusable elemental aluminum.

* * * * *

UNITED STATES PATENT AND TRADEMARK OFFICE
CERTIFICATE OF CORRECTION

PATENT NO. : 4,312,850
DATED : Jan. 26, 1982
INVENTOR(S) : DIETL, ET AL.

It is certified that error appears in the above—identified patent and that said Letters Patent is hereby corrected as shown below:

Cover page, [73] Assignee:, change "Helictronic" to -- Heliotronic--.

Signed and Sealed this

Eighth Day of March 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,312,850

DATED : January 26, 1982

INVENTOR(S) : Josef Dietl et al.

It is certified that error appears in the above-identified patent and that said Letters Patent are hereby corrected as shown below:

Cover page, [73] Assignee: change the spelling of "Berghausen" to --- "Burghausen"

Signed and Sealed this

Sixth Day of September 1983

[SEAL]

Attest:

GERALD J. MOSSINGHOFF

Attesting Officer     Commissioner of Patents and Trademarks